(12) United States Patent
Anderson et al.

(10) Patent No.: US 8,657,260 B2
(45) Date of Patent: Feb. 25, 2014

(54) INTEGRATED WINCHHEAD

(75) Inventors: Eric Anderson, Plover, WI (US);
Kawa-She-Quoen Okerlund, Wittenberg, WI (US); Todd Walstrom, Weston, WI (US); Victor Burmeister, Weston, WI (US); Kyle Osimitz, Wausau, WI (US)

(73) Assignee: Cequent Performance Products, Inc., Plymouth, MI (US)

( * ) Notice: Subject to any disclaimer, the term of this patent is extended or adjusted under 35 U.S.C. 154(b) by 914 days.

(21) Appl. No.: 12/778,023

(22) Filed: May 11, 2010

(65) Prior Publication Data

US 2011/0278522 A1    Nov. 17, 2011

(51) Int. Cl.
 B66D 1/00    (2006.01)
(52) U.S. Cl.
 USPC ............ 254/323; 254/329; 254/332; 254/380
(58) Field of Classification Search
 USPC ......... 254/264, 266, 323, 326, 329, 331, 332, 254/380, 383–385
 See application file for complete search history.

(56) References Cited

U.S. PATENT DOCUMENTS

| | | | |
|---|---|---|---|
| 2,126,251 A * | 8/1938 | Gaetke | 249/217 |
| 3,069,038 A * | 12/1962 | Ahlbin | 414/483 |
| 3,134,575 A * | 5/1964 | Walter | 254/134.3 CL |
| 3,326,398 A | 6/1967 | Reed | |
| 3,785,677 A | 1/1974 | Calkins | |
| 4,463,965 A | 8/1984 | Lawson | |
| 4,687,219 A | 8/1987 | Rendzio | |
| 4,802,685 A | 2/1989 | Godbersen | |
| 4,820,111 A | 4/1989 | Godbersen | |
| 4,986,571 A | 1/1991 | Godbersen | |
| 5,064,336 A * | 11/1991 | Godbersen | 414/559 |
| 5,076,603 A | 12/1991 | Godbersen | |
| 5,158,032 A * | 10/1992 | Pitt | 114/263 |
| 5,273,391 A | 12/1993 | White | |
| 5,417,447 A | 5/1995 | Godbersen | |
| 6,017,173 A | 1/2000 | Anthony et al. | |
| 6,431,525 B1 | 8/2002 | Roll | |
| 7,125,032 B2 | 10/2006 | Hopper | |
| 7,219,914 B2 | 5/2007 | Huddleston | |
| 7,237,788 B1 | 7/2007 | Norbits | |
| 7,967,278 B2 | 6/2011 | Anderson et al. | |
| 2010/0148139 A1 | 6/2010 | Anderson et al. | |
| 2011/0278521 A1 | 11/2011 | Okerlund et al. | |

FOREIGN PATENT DOCUMENTS

EP    2 386 445    11/2011
WO    2004/002777    1/2004

* cited by examiner

*Primary Examiner* — Emmanuel M Marcelo
*Assistant Examiner* — Angela Caligiuri
(74) *Attorney, Agent, or Firm* — McDonald Hopkins LLC

(57) ABSTRACT

Apparatus for an integrated winchhead winch are described herein. An integrated winchhead comprising a frame, a winch and a wedge. The frame may include a mounting base at a first end and a bow stop mounting area at a second end of the frame. The winch may be housed within the frame. The wedge may be attached to the mounting base and may also be mountable on a base stand, wherein the wedge may be adjustably mounted to the base stand and the mounting base. The winchhead may be mountable at two different angles and be vertically adjustable along the base stand. A bow stop may be secured to the bow stop mounting area.

16 Claims, 15 Drawing Sheets

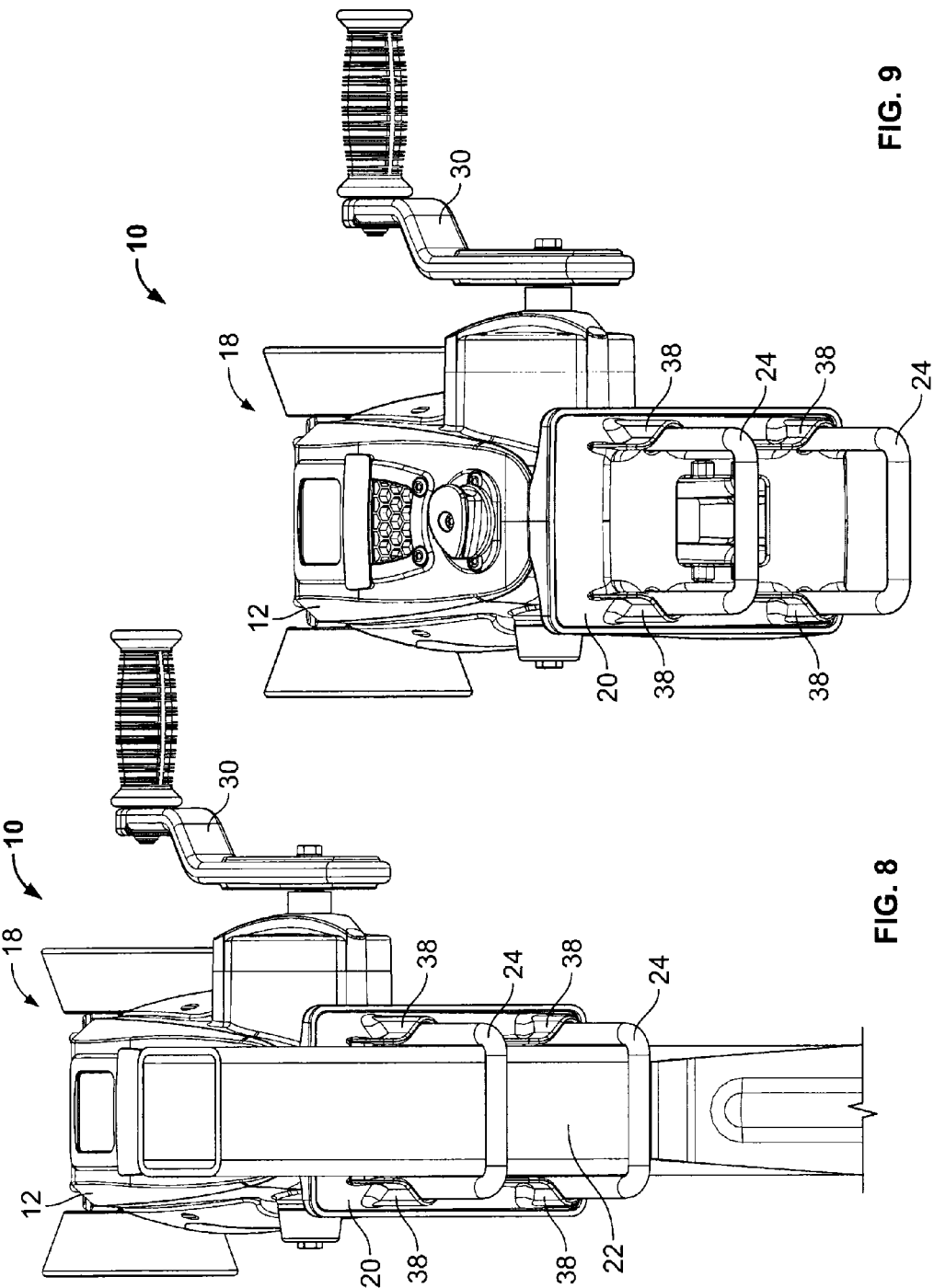

INTEGRATED WINCHHEAD

FIELD OF INVENTION

The present invention relates generally to a winch and, more particularly, to an adjustable and integrated winch and winch head.

BACKGROUND

Towing vehicles or trailers are designed to secure and haul cargo. Trailers may be arranged to haul various types of cargo, such as boats, automobiles, consumer products, and the like. Many such cargo items may be large, heavy and difficult to move or maneuver onto the bed or frame of a towing trailer. To assist in moving or maneuvering the cargo onto the towing trailer, such trailers may often be equipped with a winch or winch assembly.

In boat trailers, a stand or base member typically extends upwardly from a front portion of the trailer and a head member is attached to the base member and extends rearwardly therefrom. A bow stop is attached to an end portion of the head member opposite the base member and engages with the bow of a boat to limit the positioning of the boat on the trailer. The winch is commonly attached to the head member between the bow stop and the base member. The winch may be connected to the boat by, for example, a strap, cable, rope, chain or the like that may aid in pulling the boat onto the trailer. The winch may be used to assist in the final positioning of the boat onto the trailer. This type of situation may commonly occur while using a boat trailer to remove a boat from a body of water.

These traditional boat trailers require the assembly of the base member to the trailer, the head member to the base member, the bow stop to the head member and the winch to the head member. These steps are time consuming and may provide for a poor aesthetic quality. Additionally, these various components must be individually selected and aligned in a proper orientation to allow for a preferred positioning of a particular boat on the trailer.

SUMMARY

Apparatus for an integrated winchhead are described herein. An integrated winchhead comprising a frame, a winch and a wedge. The frame may include a mounting base at a first end and a bow stop mounting area at a second end of the frame. The winch may be housed within the frame. The wedge may be attached to the mounting base and mountable on a base stand, wherein the wedge may be adjustably mounted to the base stand and the mounting base. The winchhead may be mountable at two different angles and be vertically adjustable along the base stand. A bow stop may be secured to the bow stop mounting area.

DESCRIPTION OF THE DRAWINGS

Objects and advantages together with the operation of the invention may be better understood by reference to the following detailed description taken in connection with the following illustrations, wherein:

FIG. 8 illustrates a rear view of the integrated winchhead mounted on a base stand.

FIG. 9 illustrates a rear view of the integrated winchhead.

DETAILED DESCRIPTION

Figure 1:
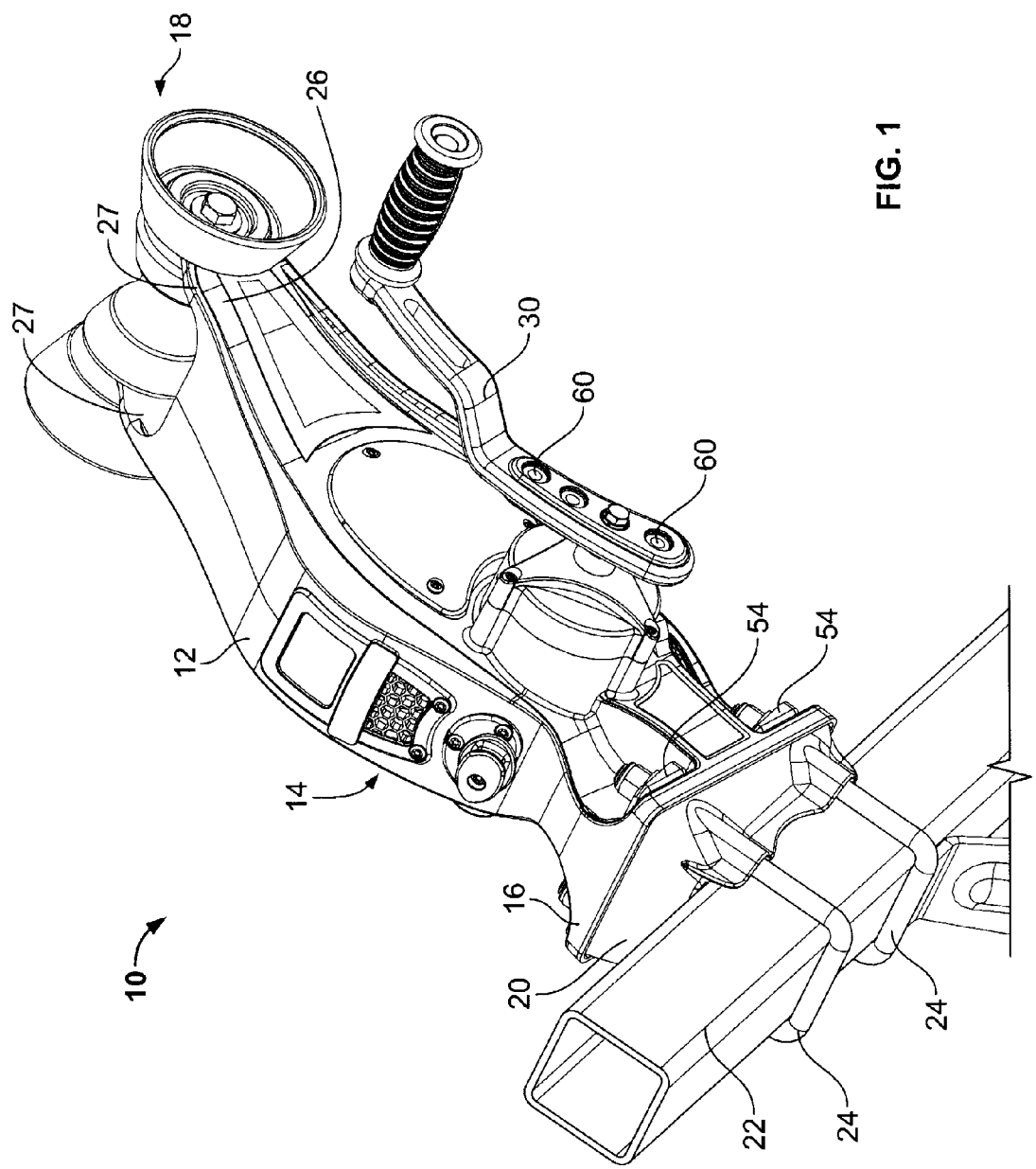
FIG. 1 illustrates a perspective view of an integrated winchhead attached to a base stand of a boat trailer and in use with a first type of bow stop.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

An integrated winchhead 10 is illustrated in FIGS. 1-3 and 6-12. The integrated winchhead 10 may include an integrated winch frame 12, a winch 14, and a bow stop 18 (FIGS. 1-3, 6 and 7). The winch is operable to assist in moving or maneuvering cargo onto a towing trailer (not shown) equipped with the winchhead 10. The winch 14 may be of any appropriate shape, size, type or configuration. By way of a non-limiting example, the winch 14 may be a one speed or two speed winch. A suitable one speed winch 14 includes that disclosed in U.S. patent application Ser. No. 12/558,252 titled "Winch Assembly", filed on Sep. 11, 2009, the disclosure of which is incorporated herein by reference. A suitable two speed winch 14 includes that disclosed in U.S. patent application Ser. No. 12/788,008 titled "Two Speed Winch Asserribly", filed on May 26, 2010, the disclosure of which is incorporated herein by reference.

The winch 14 may be connected to a cargo item by any appropriate means, such as a strap, cable, rope, chain or the like (not shown), for pulling the cargo item onto the trailer. For example, wire rope may be used. The integrated winch frame 12 may house internal components of the winch 14. In addition to the mounting features, all of the winch 14 features may be designed and incorporated into the integrated winch frame 12. The integrated winchhead 10 may also provide an aesthetic quality.

The winchhead 10 may conform to the SAE J1853 standard for marine trailer winches. For example, twice the rated tension load may be applied through a first layer of wire rope on the winchhead 10, whereby the winchhead 10 must not release the load and still be able to operate after this overload test. In addition, three times the rated tension load may be applied through the first layer of wire rope on the winchhead 10, whereby the winchhead 10 must not release the load.

The winchhead 10 may be mounted by bolting or welding in such a manner that three times the rated straight line pull of the winchhead 10 can be applied without failure of the winchhead 10 attachment. In a non-limiting example, the winchhead 10 may be rated up to 3,200 lbs, whereby 9,600 lbs. may be achieved three times without releasing the load. Moreover, when the winchhead 10 includes a two speed winch 14, the winchhead 10 may have a capacity of up to 3200 lbs. in low gear and a capacity of up to 2000 lbs. in high gear.

Figure 4:
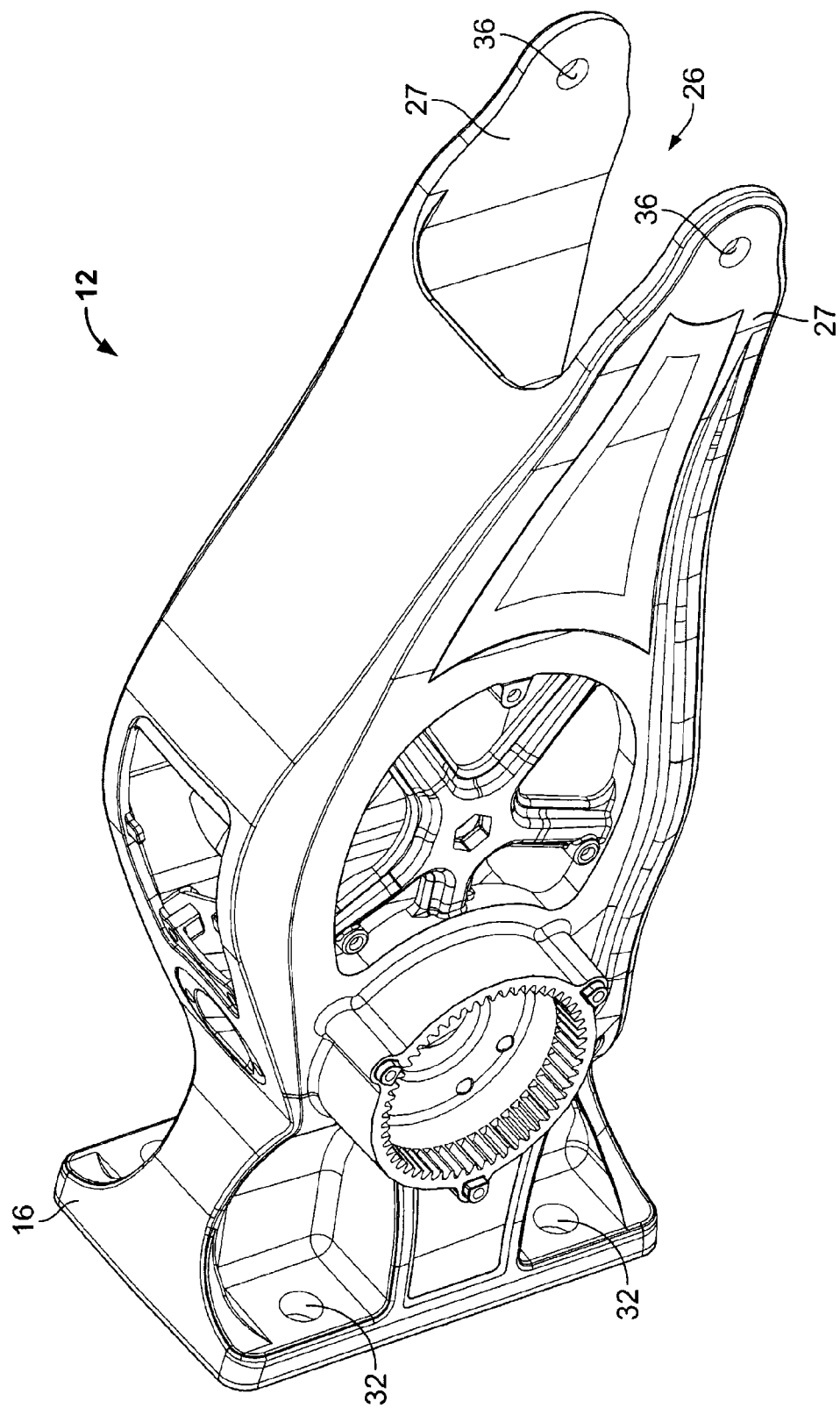
FIG. 4 illustrates a perspective view of the frame of the integrated winchhead.
Figure 5:
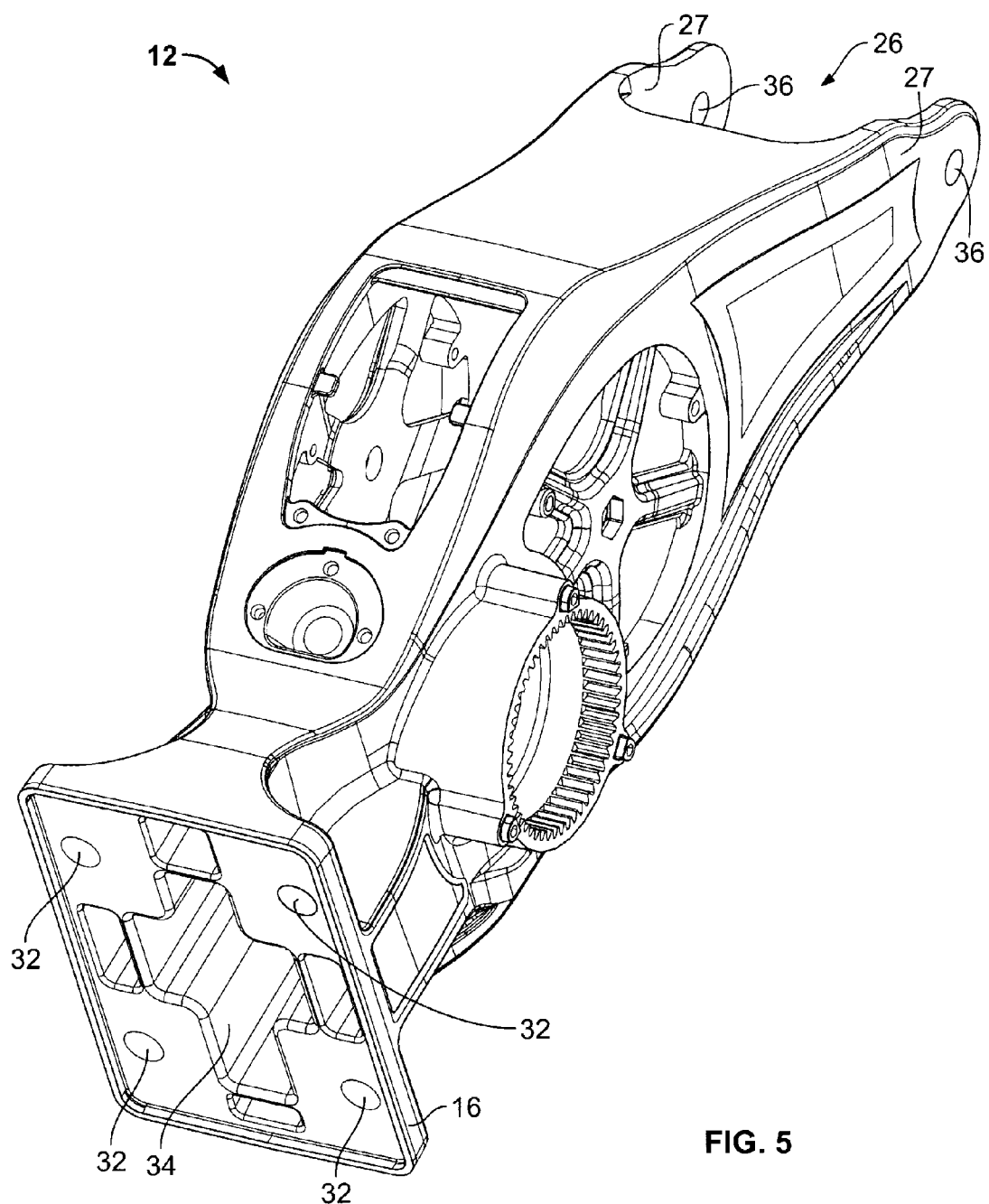
FIG. 5 illustrates another perspective view of the frame.

Most winch frames may be manufactured from a formed steel stamping. This material and process may severely limit the features and aesthetics that can be incorporated into the design. The integrated winch frame 12 may be fabricated out of any appropriate material and any appropriate processes, such as being fabricated out of high-pressure die-cast aluminum into a one-piece die-cast aluminum component (FIGS. 4 and 5). For example, die casting copper, die casting zinc, permanent mold casting, sand casting, evaporative pattern casting, shell mold casting, composite-mold casting, forging, stamping, plastic molding, hot isostatic pressing, or the like may utilized to fabricate the integrated winch frame 12.

Such an arrangement may incorporate many desired features, allow for pleasant aesthetics, provide for a high strength construction, and make manufacturing easier. For example, once fabricated, a winch frame 12, mounting area 16, and bow stop mounting area 26 may be of a stylized and blended configuration to create a continuous flowing structure (FIGS. 4 and 5). This integrated winch frame 12 may provide an improved aesthetic quality unavailable in conventional winch devices.

Figure 2:
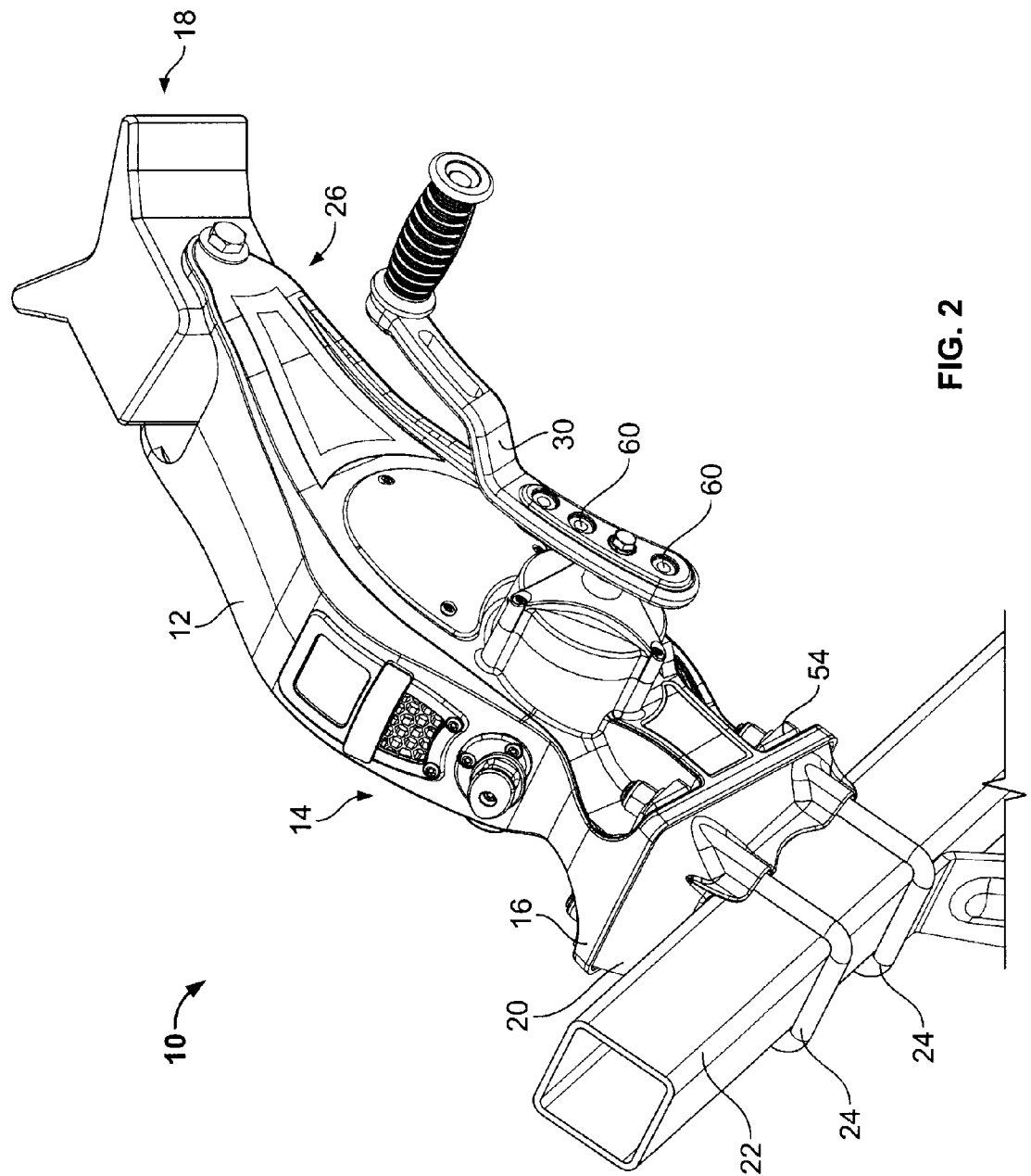
FIG. 2 illustrates a perspective view of the integrated winchhead attached to a base stand of a boat trailer and in use with a second type of bow stop.

The integrated winchhead 10 may also include an adjustable handle 30 that may operate the winch 14. The handle 30 may be attached to either side of the integrated winchhead 10, depending on the configuration of winch 14. For example, the handle 30 may be mounted on the left hand side of the integrated winchhead 10. Alternatively, if utilizing a single speed winch, the handle 30 may be mounted on either side of the integrated winchhead 10, such as the left or right hand side. The handle 30 may include a number of adjustment apertures 60 that may be located along the handle 30 (FIGS. 1 and 2). The handle 30 may be oriented at a number of different positions via the adjustment apertures 60 to either shorten or lengthen the lever arm portion of the handle 30.

The varying lengths of the handle 30 may permit the handle 30 to be assembled in a variety of positions depending on need and circumstances. U.S. patent application Ser. No. 12/558,252, titled "Winch Assembly", which is herein incorporated by reference in its entirety, describes in further detail such a handle, its mode(s) of operation, and the operation of a single speed winch.

The integrated winchhead 10 may combine a traditional winch 14 and bow stop 18 (FIGS. 1-3 and 6-12). This may be accomplished by any appropriate means, such as by die casting the integrated winch frame 12 complete with the essential mounting features for both mounting the integrated winchhead 10 to a base stand 22 of a trailer and for mounting the bow stop 18.

The integrated winch frame 12 may include a mounting area 16 (FIGS. 1-7, 13 and 15). The mounting area 16 may be utilized for attachment of the integrated winch frame 12 to a base stand 22 (FIGS. 1-3, 6 and 7). The mounting area 16 may be of any appropriate shape or size, such as a generally square or rectangular shape. The mounting area 16 may be located at any appropriate position on the integrated winch frame 12, such as at an end opposite that of the bow stop 18.

The mounting area 16 may include at least one mounting aperture 32 (FIGS. 4 and 5). The mounting area 16 may include any appropriate number of apertures 32, such as four. The mounting apertures 32 may be of any appropriate shape or size, such as circular or square. The mounting apertures 32 may be located at any appropriate position on the integrated winch frame 12, such as at an end opposite that of the bow stop mounting area 26 (FIGS. 4 and 5). The mounting apertures 32 may aid in securing the integrated winch frame 12 to a wedge 20 and the base stand 22 with the use of fasteners 24, for example.

The base stand 22 may be of any appropriate shape or size, such as a generally tubular shape (FIGS. 1-3, 6 and 7). For example, the base stand 22 may be of a generally cylindrical, square or rectangular shape. The base stand 22 may be fabricated out of any appropriate type of material, such as aluminum and steel.

Figure 11:
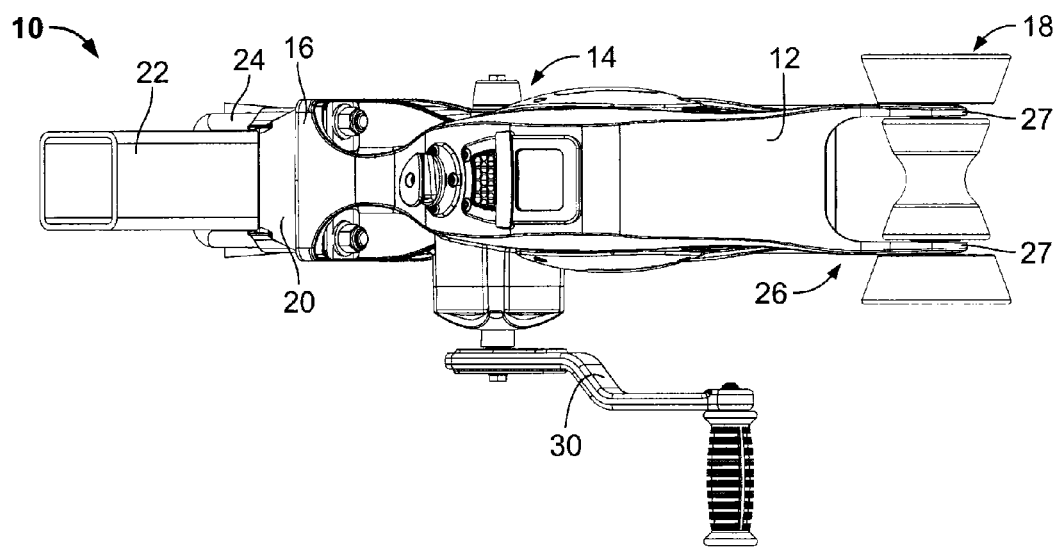
FIG. 11 illustrates a top view of the integrated winchhead mounted on a base stand.
Figure 12:
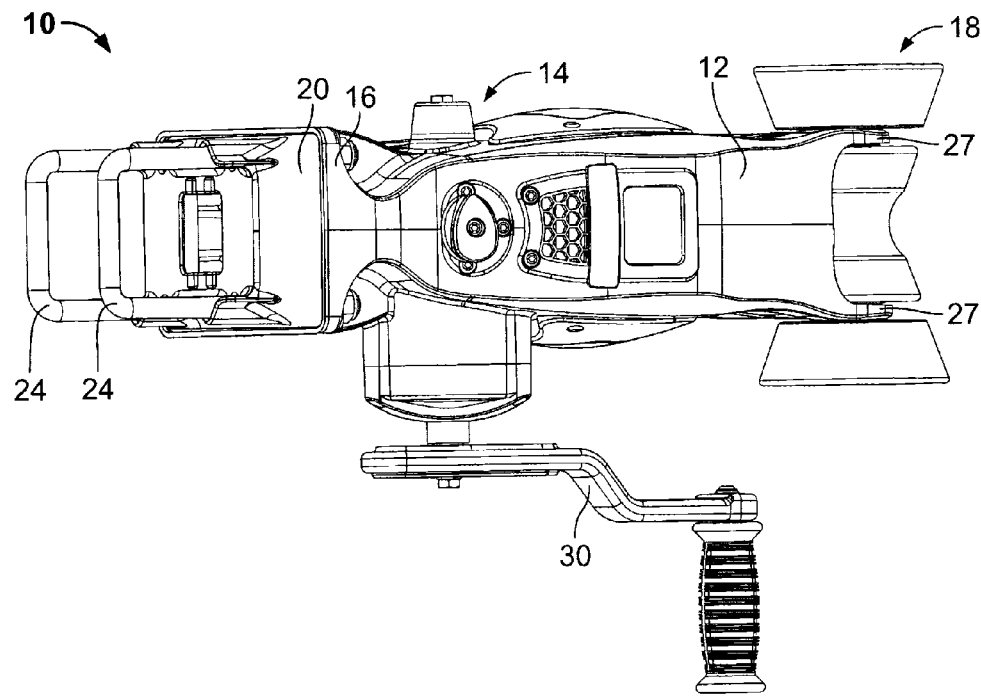
FIG. 12 illustrates a slightly rotated top view of the integrated winchhead with the base stand removed.

The integrated winch frame 12 may include a bow stop mounting area 26 (FIGS. 1, 4, 5, 11 and 12). The bow stop mounting area 26 may be of any appropriate shape or size, such as a generally oblong configuration with a pair of spaced apart arms 27. The bow stop mounting area 26 may include bow stop mounting apertures 36 in arms 27 (FIGS. 4 and 5). The mounting apertures 36 may be of any appropriate shape or size, such as circular or square. The mounting apertures 36 may permit the bow stop 18 to be secured to the integrated winch frame 12, such as with fasteners, between arms 27. The bow stop 18 may be located at any appropriate position on the integrated winch frame 12, such as at the bow stop mounting area 26 (FIGS. 1, 11 and 12).

Typically, cargo, such as a boat, may need to be positioned, such as during loading, and secured in order to prevent the cargo from moving upward or forward during a sudden stop. This may be accomplished by utilizing the bow stop 18 (FIGS. 1-3 and 6-12). The bow stop 18 may be of any appropriate shape, size, type or configuration, such as rollers (FIG. 1) or a V-shaped bumper (FIG. 2).

The integrated winchhead 10 may provide for adjustability in aligning the bow stop 18 and a bow eye of a boat to the integrated winchhead 10. The bow stop 18 may provide a mechanical stop, whereby it may prevent a boat or another similar device from moving upward or moving forward during a sudden stop or any other similar type motions. The bow stop 18 may also provide for the proper positioning for the boat to sit on the trailer, which may be important for weight distribution and clearance.

Figure 3:
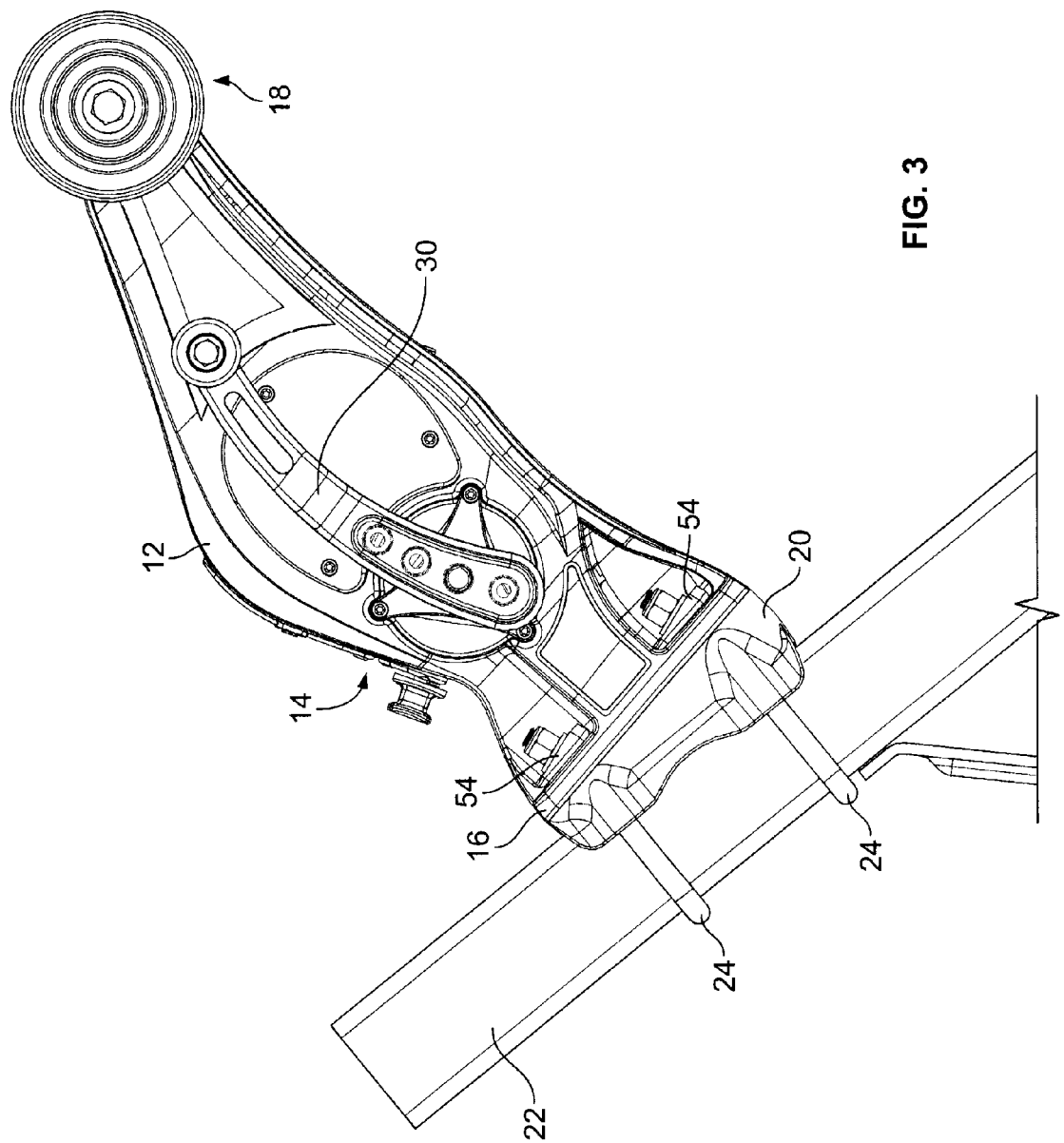
FIG. 3 illustrates a side view of an integrated winchhead.
Figures 6, 7:
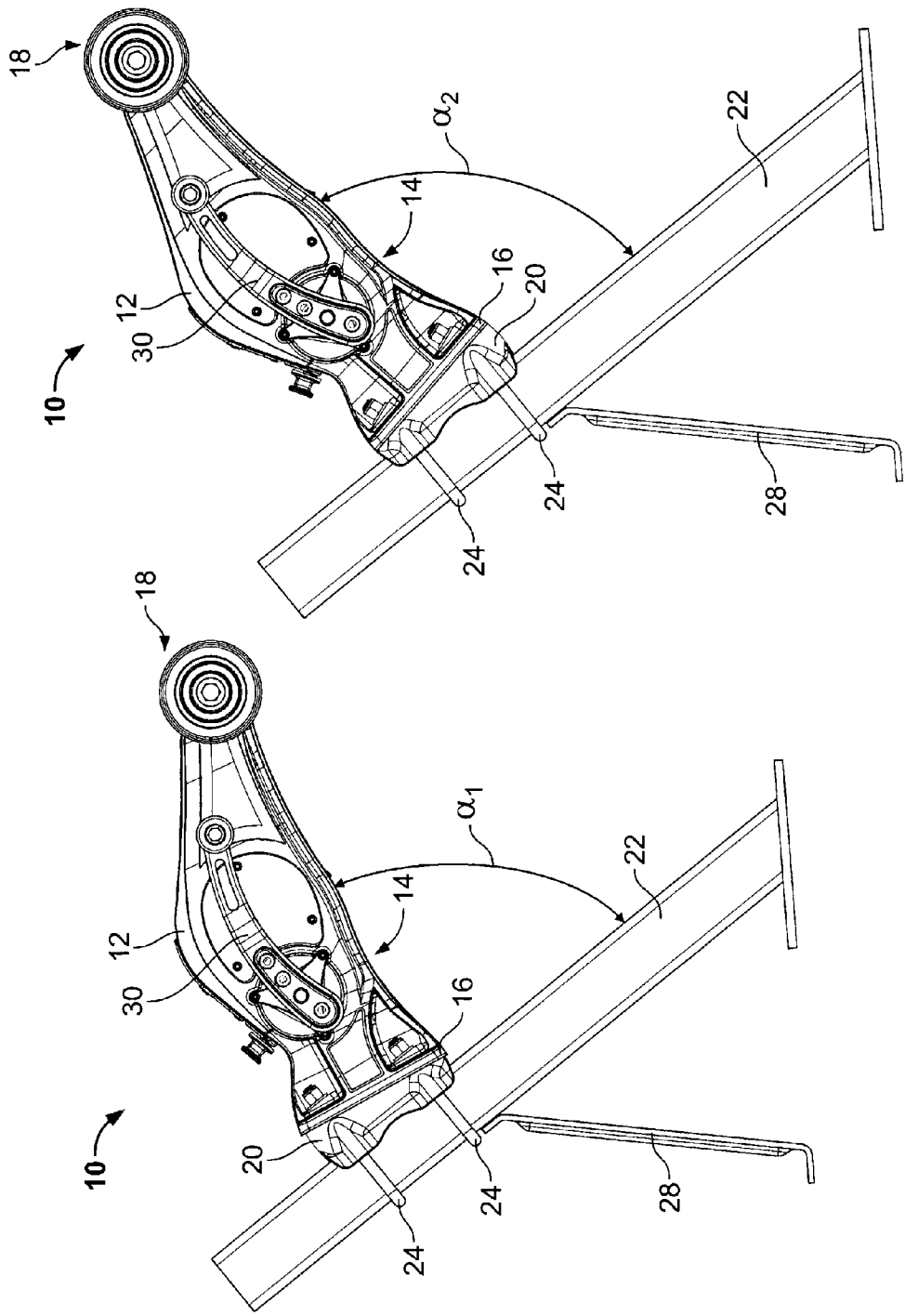
FIG. 6 illustrates a side view of the integrated winchhead mounted on a base stand in a first or downward position.
FIG. 7 illustrates a side view of the integrated winchhead mounted on a base stand in a second or upward position.
Figure 10:
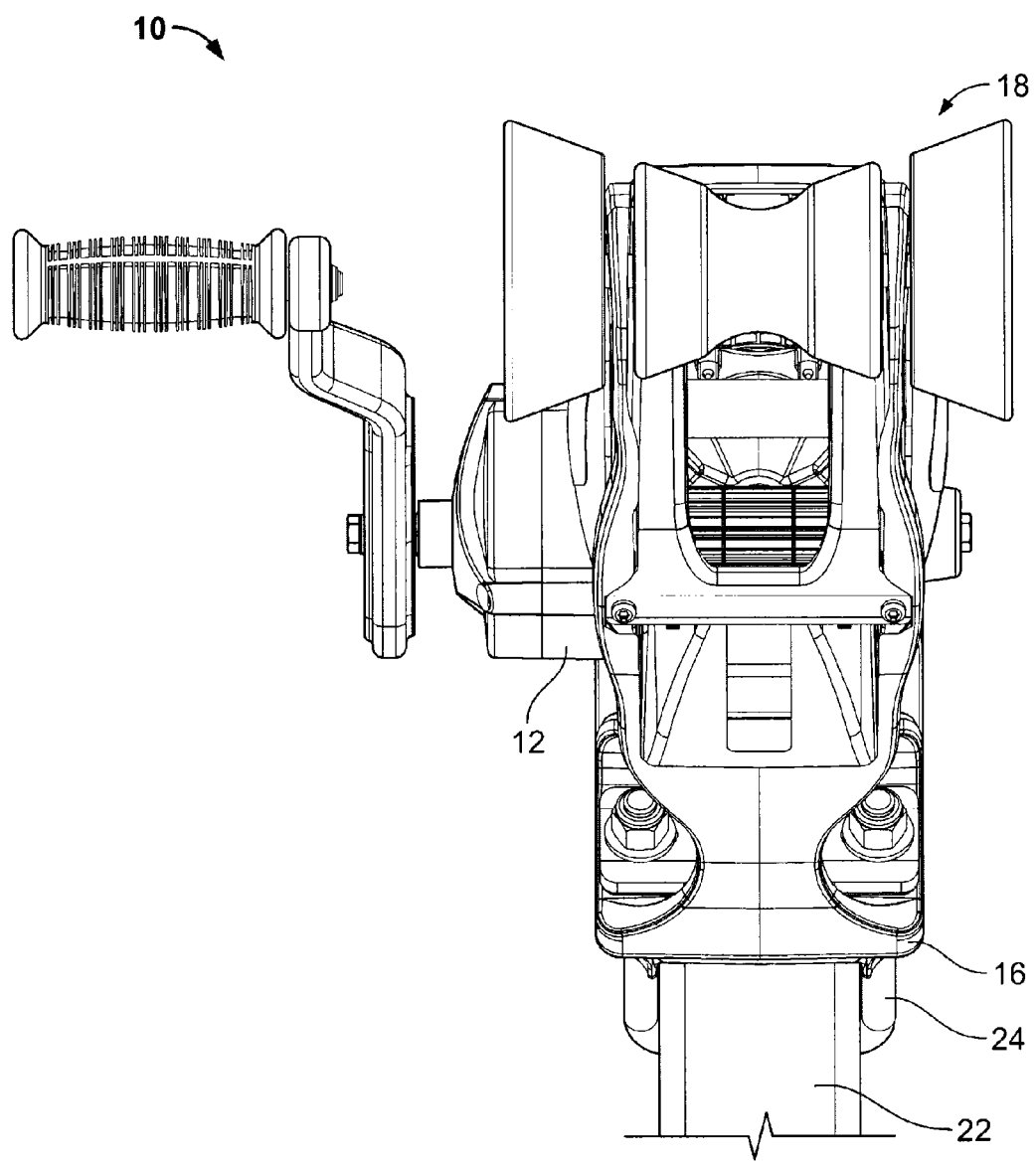
FIG. 10 illustrates a front view of the integrated winchhead mounted on a base stand.

The integrated winchhead 10 may include a mounting wedge 20 (FIGS. 1-3, 6-9 and 11-19), which may facilitate the mounting of the winchhead 10 to the base stand 22. The mounting wedge 20 may be of any appropriate shape or size, such as of a generally wedged shaped configuration when viewed in profile (FIGS. 3, 6 and 7). The mounting wedge 20 may be fabricated out of any appropriate material, such as plastic, steel, aluminum or the like. In addition, the mounting wedge 20 may also be fabricated from a combination of any appropriate material, such as plastic combined with any appropriate material such as aluminum, copper, or zinc.

The mounting wedge 20 may be located at any appropriate position on the integrated winchhead 10. For example, the mounting wedge 20 may be located between the mounting area 16 of the integrated winch frame 12 and the base stand 22 (FIGS. 1-3, 6 and 7). The mounting wedge 20 may be secured to the integrated winch frame 12 by any appropriate means, such as with fasteners, adhesive, detent arrangement, a dimple or the like (FIGS. 1-3, 6 and 7).

The mounting wedge 20 may include at least one gusset or fin 38 and at least one mounting aperture 42 (FIGS. 8, 9, 13 and 14). The wedge 20 may include any appropriate number of mounting apertures 42, such as four. The mounting apertures 42 may be located at any appropriate position on the wedge 20. For example, one mounting aperture 42 may generally be located adjacent each corner of the wedge 20, whereby each U-bolt 24 may be located through each mounting aperture 42 (FIGS. 13-19).

The wedge 20 may include any appropriate number of fins 38, such as four. For example, the number of fins 38 may correspond to the number of wedge mounting apertures 42 and U-bolts 24. The fins 38 may be located at any appropriate position on the wedge 20. For example, one fin 38 may generally be located adjacent each corner of the wedge 20 (FIGS. 13-19). Each fin 38 may surround a portion of each U-bolt 24 and a portion of the base stand 22 (FIGS. 1-3 and 6-9). The fins 38 may be of any appropriate shape or size, such as of a generally curved or C-shape. Each fin 38 may also provide an aesthetic appearance to the outer edges of the mounting wedge 20 as well as a smooth transitional appearance from the integrated winch frame 12 to the base stand 22.

Figure 13:
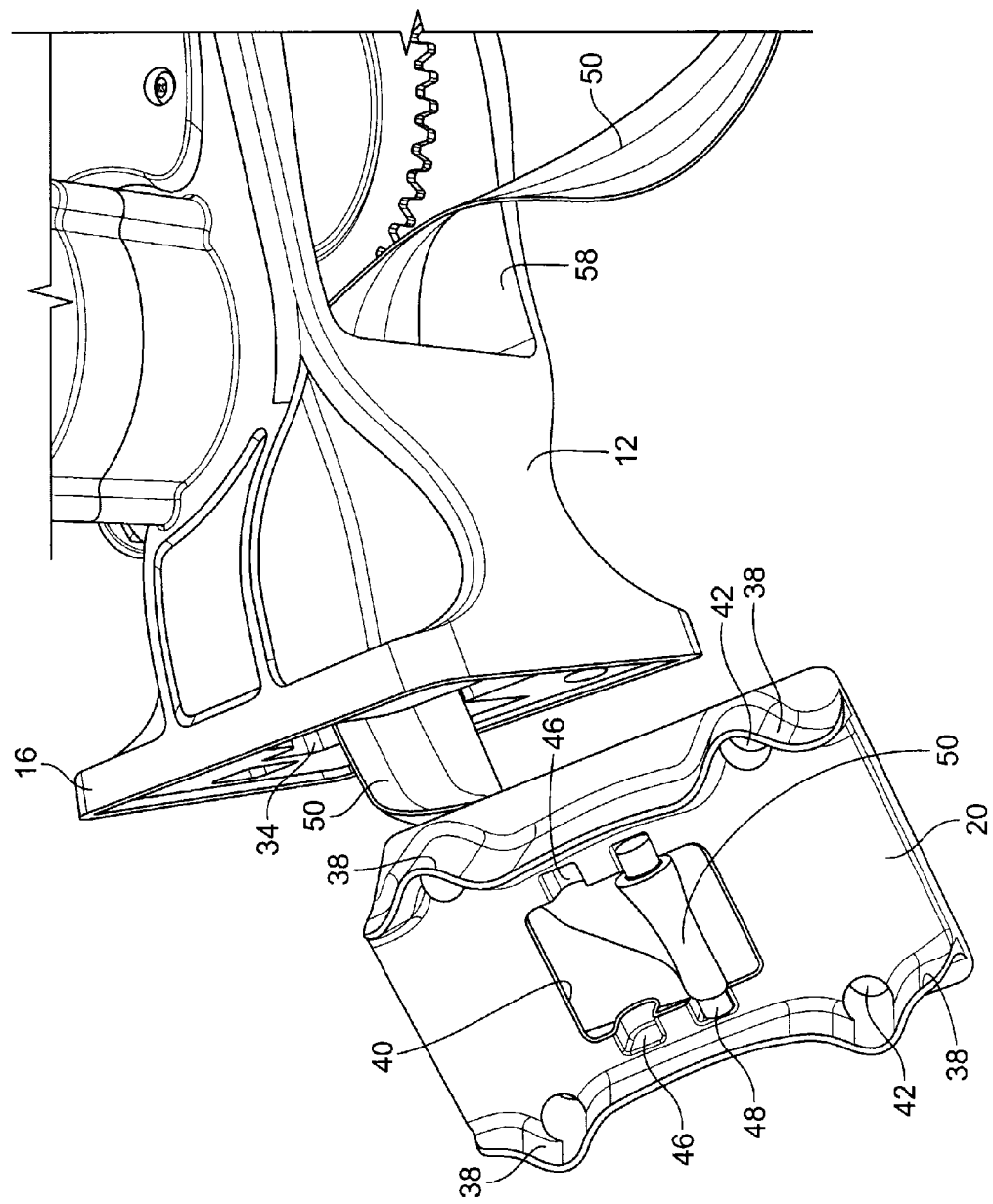
FIG. 13 illustrates a fragmented close up perspective view of the integrated winchhead in use with a safety strap.

The integrated winch frame 12 may include a safety restraint aperture 34 (FIGS. 5 and 13). The safety restraint aperture 34 may provide an area for a safety restraint to be attached to the wedge 20 to allow for the safety restraint to be attached to the winchhead 10. The safety restraint aperture 34 may be of any appropriate shape or size, such as circular, oval, rectangular. The safety restraint aperture 34 may be located at any appropriate position on the frame 12, such as at the approximate center of the mounting area 16 (FIG. 5).

The mounting wedge 20 may also include a safety restraint aperture 40 (FIGS. 13-16 and 18). The safety restraint aperture 40 may be of any appropriate shape or size, such as a generally circular, square or rectangular shape. The safety restraint aperture 40 may be located at any appropriate position on the mounting wedge 20, such as at the approximate center of the mounting wedge 20 (FIGS. 13-16 and 18). When assembled, the safety restraint aperture 34 of the integrated winch frame 12 may align with the safety restraint aperture 40 of the wedge 20.

Figure 20:
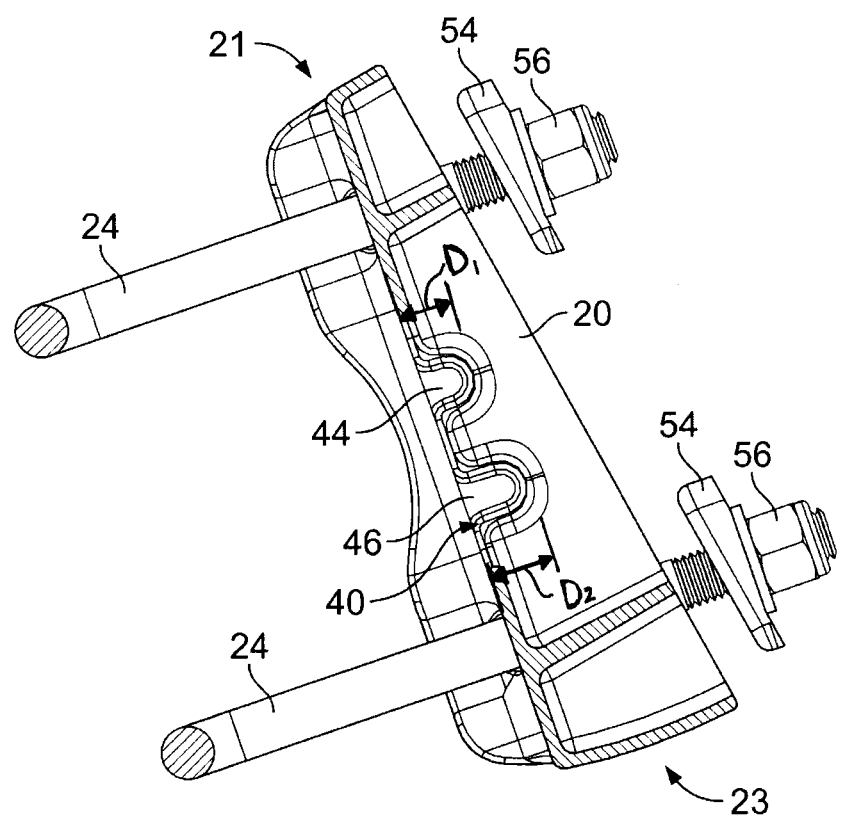
FIG. 20 illustrates a cross-sectional view of the mounting wedge taken along lines 20-20 of FIG. 18.

The mounting wedge 20 may also include a first pair of slots 44 and a second pair of slots 46 (FIGS. 13-16 and 18). The first pair of slots 44 and the second pair of slots 46 may be of any appropriate shape or size. For example, the first pair of slots 44 may be of a first depth $D_1$ and the second pair of slots 46 may be of a second depth $D_2$, whereby the first pair of slots 44 may be of a shallower depth $D_1$ and the second pair of slots 46 may be of a deeper depth $D_2$ (FIG. 20).

The first pair of slots 44 may be located at any appropriate position on the wedge 20, such as adjacent the safety restraint aperture 40. For example, the first pair of slots 44 may be located on each side of the safety restraint aperture 40 (FIGS. 13-16 and 18). Similarly, the second pair of slots 46 may be located at any appropriate position on the wedge 20, such as adjacent the safety restraint aperture 40. For example, the second pair of slots 46 may be located on each side of the safety restraint aperture 40 (FIGS. 13-16 and 18).

Figure 14:
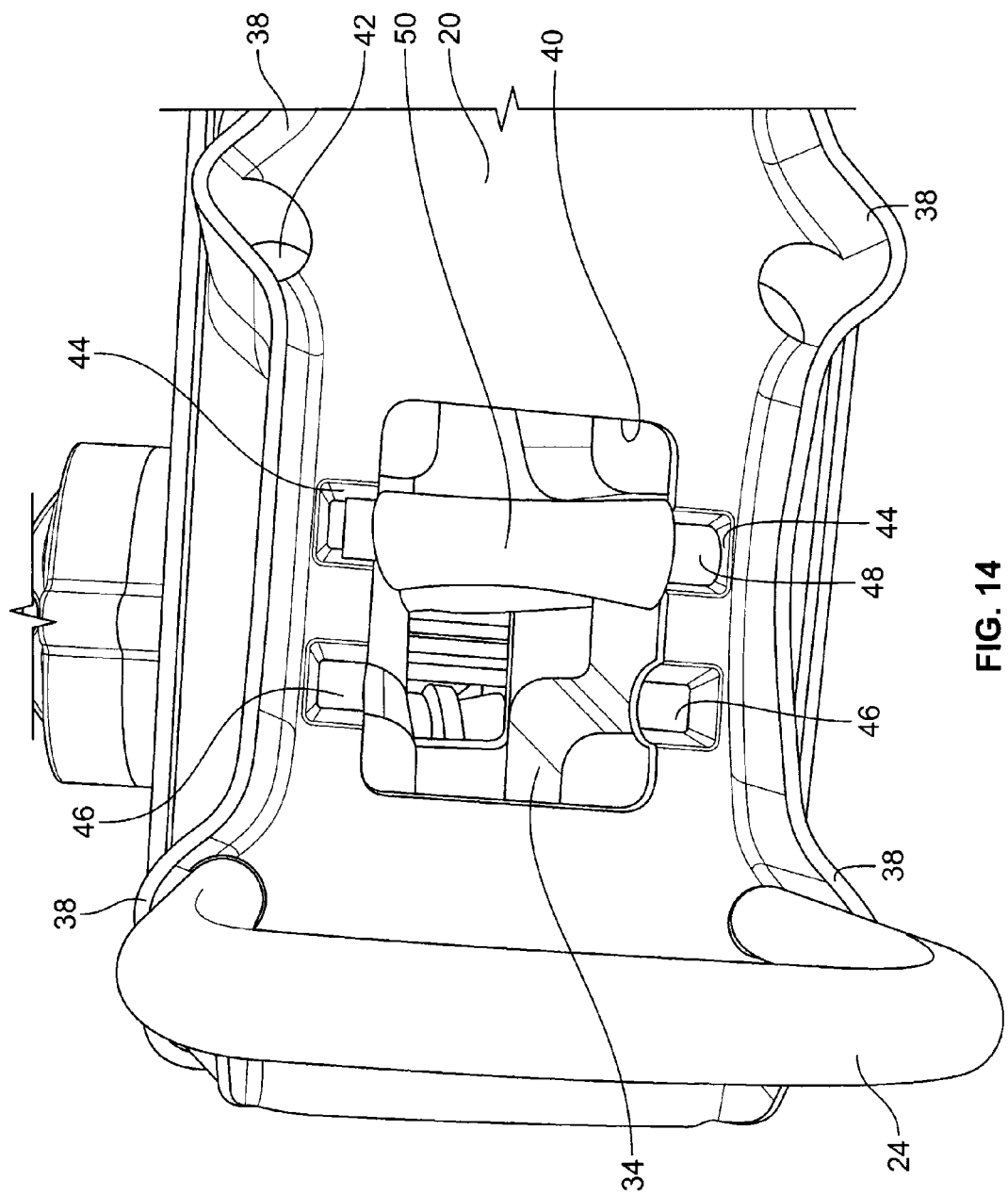
FIG. 14 illustrates a fragmented detailed perspective view of the safety strap and mounting wedge.
Figure 15:
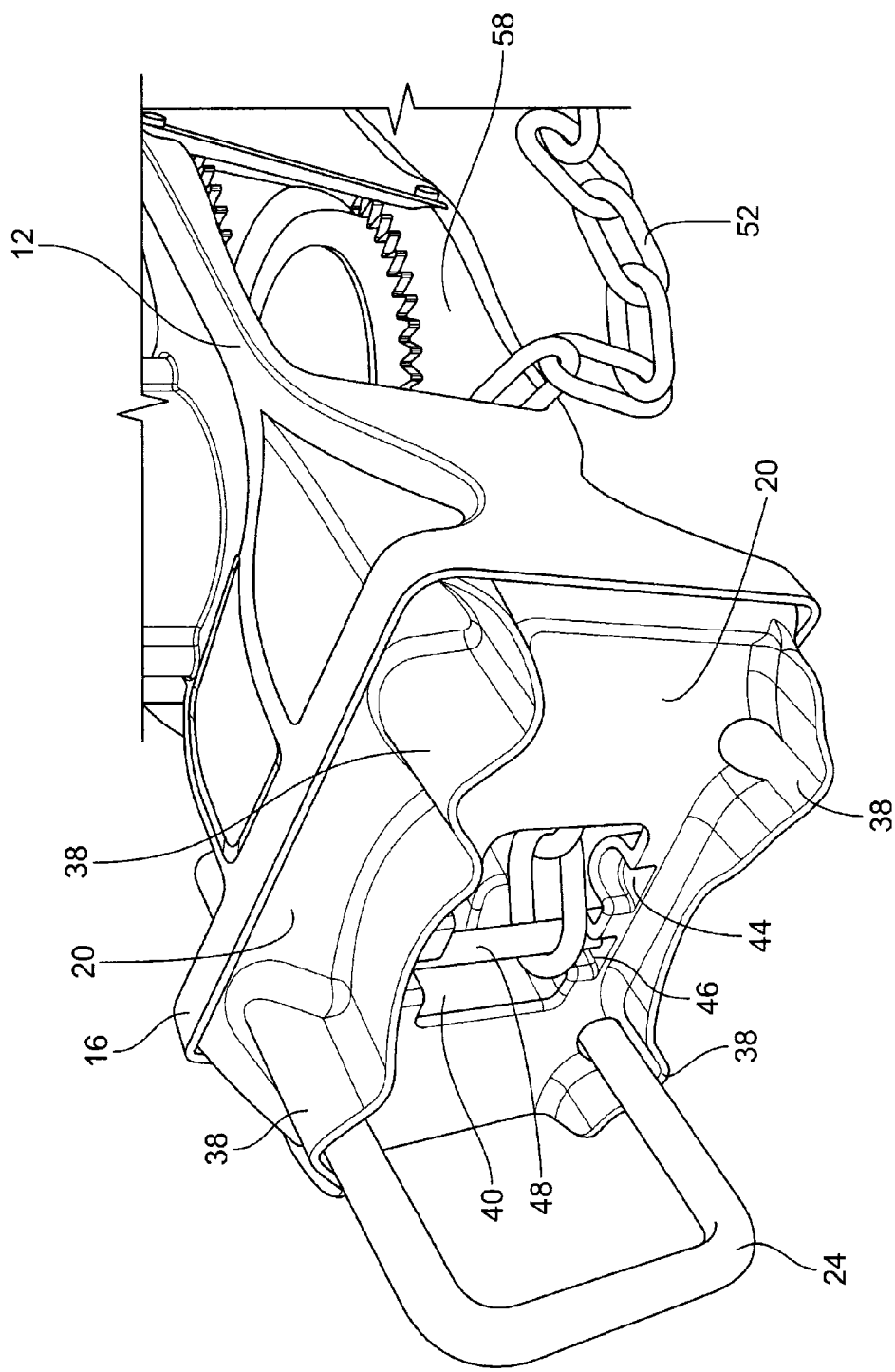
FIG. 15 illustrates a fragmented close up perspective view of the integrated winchhead in use with a safety chain.
Figure 16:
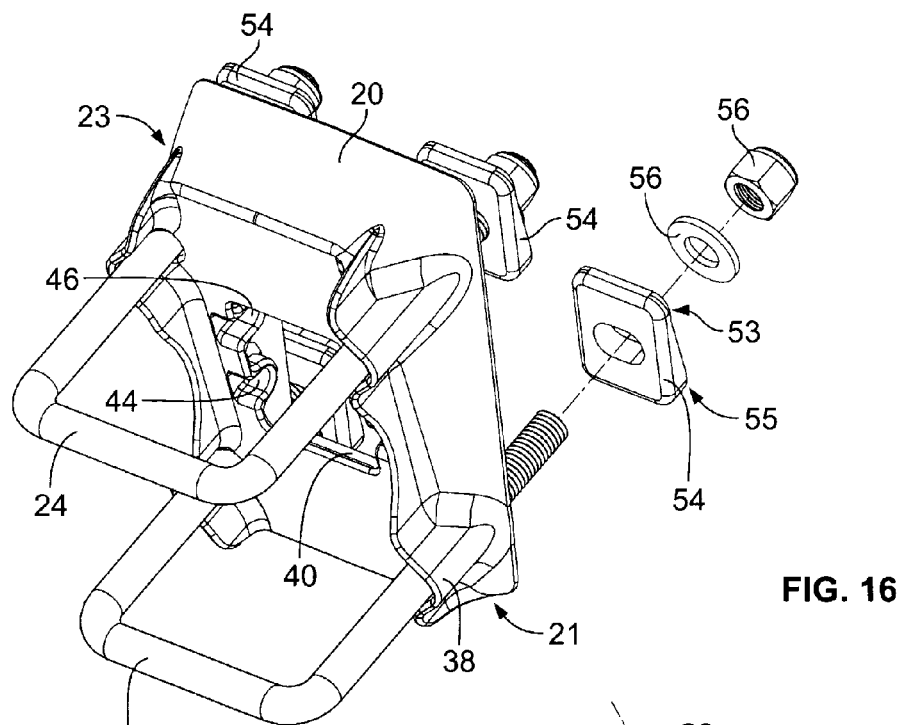
FIG. 16 illustrates a partially exploded perspective view of a mounting wedge in a first position.

The integrated winchhead 10 may include a rod 48 (FIGS. 13-15). The rod 48 may be of any appropriate shape or size, such as a generally cylindrical shape. The rod 48 may be located at any appropriate position on the integrated winchhead 10, such as within the mounting wedge 20. For example, the rod 48 may be inserted into and retained within the first or second pair of slots 44, 46 (FIGS. 13-15). The rod 48 may remain within the desired pair of slots 44, 46 by any appropriate means, such as by a frictional fit or by being trapped between the wedge 20 and the base stand 22.

The rod 48 may maintain the safety restraint, such as a safety strap 50 or a safety chain 52 within the mounting wedge 20 and integrated winch frame 12 (FIGS. 13-15). Depending upon which type of safety restraint is desired, may determine which pair of slots 44, 46 may be used. For example, when utilizing the safety strap 50, the first pair of slots 44 may be used. When utilizing the safety chain 52, the second pair of slots 46 may be used as these slots 46 have a greater depth $D_2$.

The integrated winch frame 12 may include a bottom aperture 58 (FIGS. 13 and 15). The safety strap 50 or safety chain 52 may be located and secured around the rod 48, through the aperture 40 in the wedge 20 and the aperture 34 in the integrated winch frame 12, and away from the wedge 20 and back through the integrated winch frame 12, whereby the safety strap 50 or safety chain 52 may hang out through the bottom aperture 58 (FIGS. 13 and 15).

Fasteners or U-bolts 24 may be attached to a shaft or base stand 22 at any appropriate area on the base stand 22, such as at an upper portion near an end (FIGS. 6 and 7). As an alternative, the base stand 22 may receive additional support from a support member 28 (FIGS. 6 and 7). The support member 28 may be of any appropriate shape or size, such as a generally rectangular, square or circular shape. The support member 28 may contact the base stand 22 at any appropriate location, such as slightly above the center of the base stand 22 (FIGS. 6 and 7).

The mounting wedge 20 may be adjustable and reversible, which may provide for a variety of mounting angles $\alpha_1, \alpha_2$ for the integrated winchhead 10 (FIGS. 6 and 7). The mounting wedge 20 may be positioned at any multitude of angles to provide the desired placement of the bow stop 18. For example, the mounting wedge 20 itself may be of any appropriate angle $\beta$ from the smaller end 21 to the larger end 23, such as having an approximate range from 5-15 degrees, whereby when rotated the overall range of adjustability of the wedge 20 may be approximately 30 degrees (FIGS. 16-19). In a non-limiting example, the wedge 20 may be of an approximate angle of 10 degrees. When flipped or rotated, the wedge 20 may provide for approximately 20 degrees of adjustability.

Figure 17:
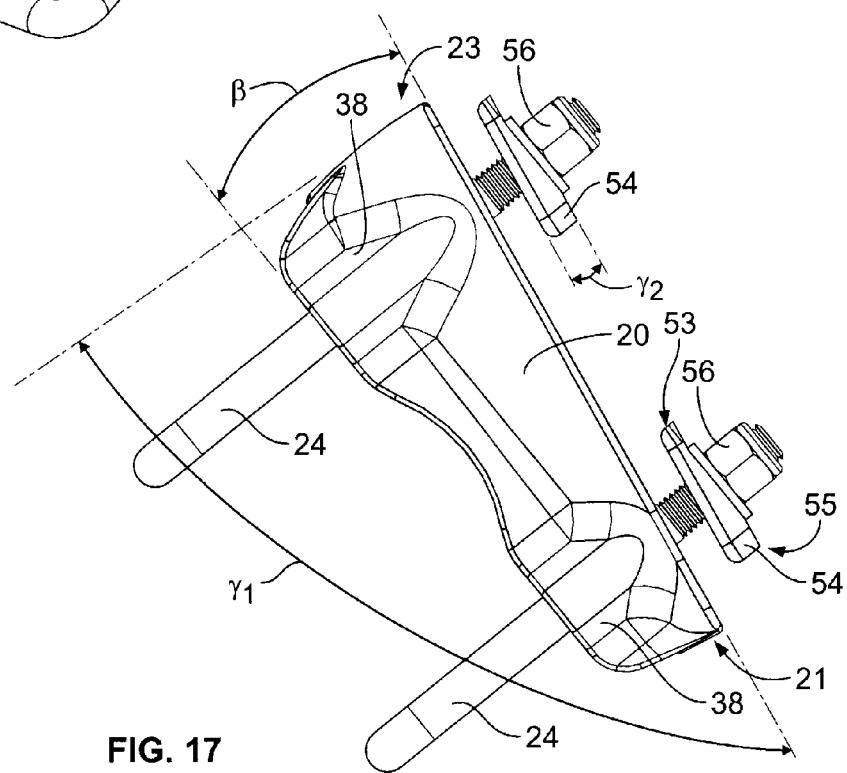
FIG. 17 illustrates a side view of the assembled mounting wedge of FIG. 16.
Figures 18, 19:
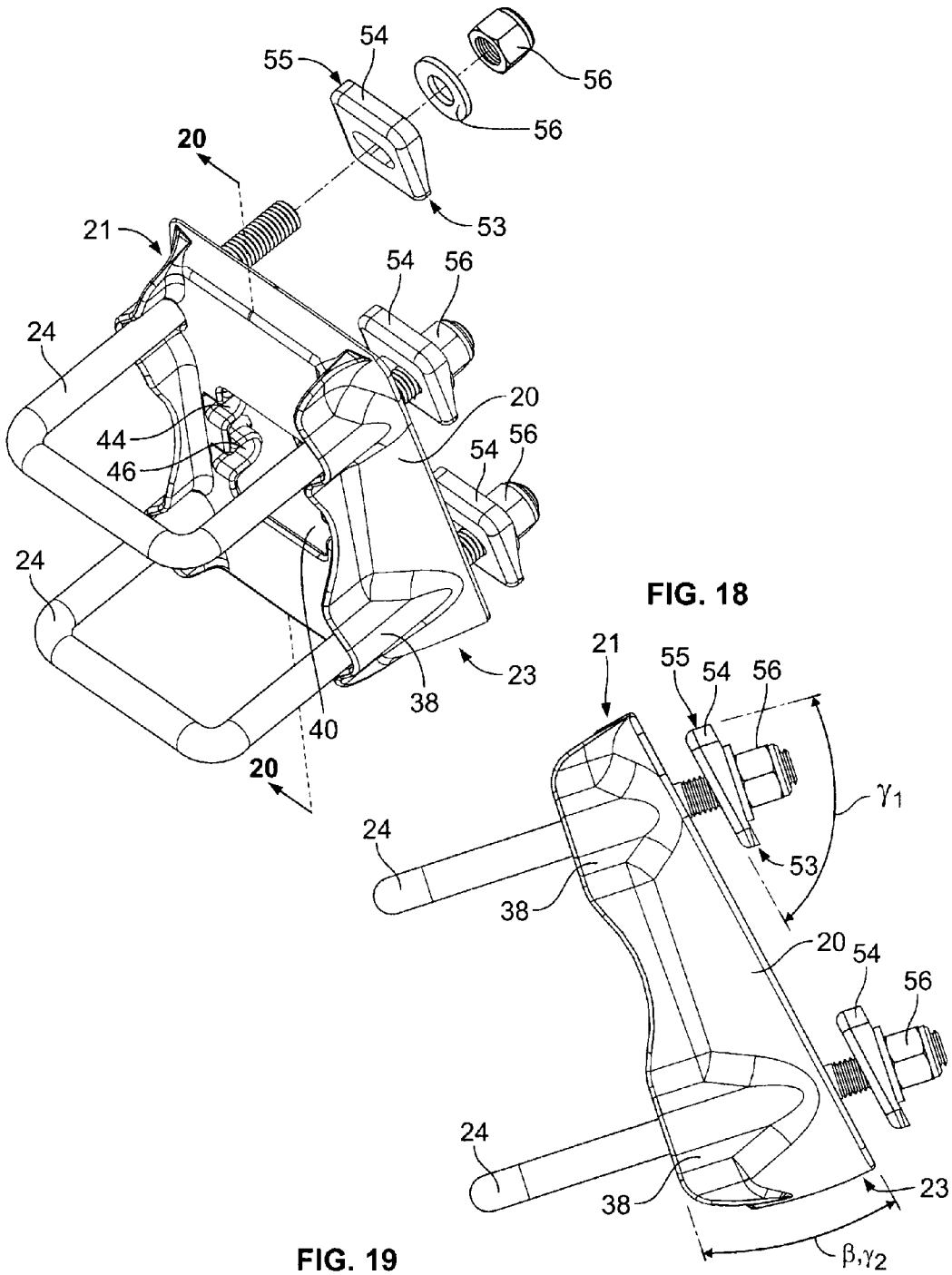
FIG. 18 illustrates a partially exploded perspective view of a mounting wedge in a second position.
FIG. 19 illustrates a side view of the assembled mounting wedge of FIG. 18.

Generally, the wedge 20 may easily be assembled to the winch frame 12 and base stand 22 at two different angles $\alpha_1$, $\alpha_2$ (FIGS. 6 and 7). The wedge 20 may utilize wedge shaped washers 54. The wedge shaped washers 54 may be of any appropriate shape, size or angle. For example, the wedge shaped washers 54 may have a larger end 55 and then taper into a smaller end 53 (FIGS. 3, 6, 7 and 16-19), whereby when assembled with the wedge 20 the wedge shaped washers 54 and wedge 20 may have complementary angles $\gamma_1, \gamma_2$ (FIGS. 17 and 19). The wedge shaped washers 54 may be fabricated out of any appropriate type of material, such as powdered metal.

The wedge shaped washers 54 may be located at any appropriate position on the wedge 20. For example, when assembled, the wedge shaped washers 54 may be located between the wedge 20 and the mounting area 16 of the winch frame 12. The wedge shaped washers 54 may be assembled to the wedge 20 by any appropriate means, such as by way of the U-bolts 24 and additional fasteners 56 (FIGS. 16-19). The fasteners 56 may be of any appropriate shape, size, type or configuration, such as nuts and washers.

As an alternative, the integrated winchhead 10 may include a dampening cushion (not shown). The dampening cushion may be located at any appropriate position on the integrated winch, such as between the mounting area 16 and the wedge 20. The dampening cushion may be utilized to increase the surface area of contact and provide for some flexibility or dampening between the integrated winchhead 10 and the wedge 20.

When the wedge shaped washers 54 are assembled to the mounting wedge 20, the larger end 55 of the washers 54 may be located towards the smaller end 21 of the wedge 20 and vice versa, whereby the smaller end 53 of the washers 54 may be located towards the larger end 23 of the mounting wedge 20 (FIGS. 16-19). The wedge 20 may be rotated or flipped end on end to adjust the angle for mounting the winch frame 16. For example, the angled surface β of the wedge 20 may be rotated approximately 180 degrees to provide for additional mounting options. The wedge shaped washer 54 may be designed to maintain an orientation between the U-bolt 24 and the wedged washer 54.

Adjustability of the mounting angle of the integrated winchhead 10 may be accomplished by any appropriate means, such as through the use of the wedge 20. In addition, the integrated winch frame 12 and base stand 22 may be designed with any desired angles. The adjustment of these angles may be achieved by utilizing the wedge 20 (FIGS. 6 and 7). The wedge 20 of the integrated winchhead 10 may provide for infinite adjustability in regards to aligning the bow stop 18 to the integrated winchhead 10. In addition, the use of the U-bolts 24 may also provide for vertical adjustment along the winch base stand 22.

The integrated winchhead 10 may be vertically adjustable along the length of the base stand 22. This vertical adjustability may be accomplished through the use of U-bolts 24. The U-bolts 24 may be positioned at a variety of locations by connecting the integrated winchhead 10 to the base stand 22 at any desired location to create continuous vertical adjustability of the integrated winchhead 10 (FIGS. 1-3, 6 and 7). The vertical adjustability created by the combination of the integrated winchhead 10 and the U-bolts 24 may provide for an ease of adjustability. The vertical adjustability along the base stand 22 may also allow for a much greater range of areas where the bow stop 18 can reach or be placed, thereby providing more secure use of a integrated winchhead 10.

Although the embodiments of the present invention have been illustrated in the accompanying drawings and described in the foregoing detailed description, it is to be understood that the present invention is not to be limited to the embodiments disclosed, but that the invention described herein is capable of numerous rearrangements, modifications and substitutions without departing from the scope of the claims hereafter.

The invention claimed is:

1. An integrated winchhead selectively attachable to a base stand, the integrated winchhead comprising:
   a frame having a bow stop mounting element;
   a winch housed at least partially within said frame; and
   a wedge adjustably mounted to said frame, wherein said wedge is configured to extend from the base stand at a plurality of angles.

2. The integrated winchhead of claim 1, wherein said wedge is extendable at two different angles relative to the base stand.

3. The integrated winchhead of claim 2, wherein said wedge is vertically adjustable along the base stand.

4. The integrated winchhead of claim 1, wherein said wedges includes a first end with a first thickness and a second end with a second thickness, whereby the first thickness is different from said second thickness.

5. The integrated winchhead of claim 1, wherein said frame extends at a first angle relative to the base stand when said wedge is mounted in a first position and extends at a second angle relative to the base stand when said wedge is mounted in a second position, said second angle being different than said first angle.

6. The integrated winchhead of claim 1 further comprising at least one wedge shaped washer operatively positionable between the base stand and said wedge.

7. The integrated winchhead of claim 6, wherein said wedge shaped washers are oriented at a complementary angle to said wedge, whereby said frame is positionable relative to the base stand at a plurality of angles.

8. The integrated winchhead of claim 6, wherein said wedge shaped washers have a first end with a first thickness and an opposite second end with a second thickness different than said first thickness.

9. The integrated winchhead of claim 1, wherein said frame is a one piece integral cast unit.

10. An integrated winchhead comprising:
    a frame including a mounting base at a first end of said frame and a bow stop mounting feature at a second end of said frame;
    a bow stop mounted on said bow stop mounting feature;
    a winch housed within said frame; and
    a wedge member secured with said frame, wherein said wedge member is configured to engage a base stand and extend at a plurality of angles relative to the base stand.

11. The integrated winchhead of claim 10, wherein said wedge member is adjustably mounted to either of said base stand and said frame, wherein adjustment of said wedge member changes an angle of said frame relative to said base stand.

12. The integrated winchhead of claim 10, wherein said wedge member is rotatably and translationally adjustable relative to the base stand.

13. The integrated winchhead of claim 10, wherein said frame is a one piece integral cast unit.

14. The integrated winchhead of claim 10, wherein said wedge member has a first thickness along a first side thereof and a second thickness along a second side thereof and said first thickness is different than said second thickness.

15. An integrated winchhead selectively attachable to a base stand, the integrated winchhead comprising:
    a frame having a bow stop mounting element;
    a winch housed within said frame;
    a wedge attached with said frame and configured to selectively engage the base stand; and
    an attachment member adjustably securing said wedge with said frame, wherein at least one of said wedge and attachment member is configured to engage said frame at a plurality of angles relative to the base stand.

16. The integrated winchhead of claim 15, wherein the attachment member includes at least one wedged nut engageable between the wedge and said frame.

* * * * *